United States Patent [19]

Siefert et al.

[11] Patent Number: 5,726,688
[45] Date of Patent: Mar. 10, 1998

[54] PREDICTIVE, ADAPTIVE COMPUTER INTERFACE

[75] Inventors: David M. Siefert, Englewood; Tab A. McCollum, Camden, both of Ohio

[73] Assignee: NCR Corporation, Dayton, Ohio

[21] Appl. No.: 536,506

[22] Filed: Sep. 29, 1995

[51] Int. Cl.⁶ .................................................. G06F 15/00
[52] U.S. Cl. ........................ 345/352; 345/353; 345/354; 345/356; 345/357
[58] Field of Search .................... 395/352, 353, 395/354, 356, 357; 345/352, 353, 354, 356, 357, 358

[56] References Cited

U.S. PATENT DOCUMENTS

| | | | |
|---|---|---|---|
| 4,622,013 | 11/1986 | Cerchio | 434/118 |
| 4,941,829 | 7/1990 | Estes et al. | 434/118 |
| 5,018,082 | 5/1991 | Obata et al. | 364/337 |
| 5,115,501 | 5/1992 | Kerr | 395/609 |
| 5,267,865 | 12/1993 | Lee et al. | 434/350 |
| 5,295,228 | 3/1994 | Koda et al. | 395/23 |
| 5,310,349 | 5/1994 | Daniels et al. | 434/350 |
| 5,333,237 | 7/1994 | Stefanopoulos et al. | 395/12 |
| 5,372,507 | 12/1994 | Goleh | 434/118 |
| 5,395,243 | 3/1995 | Lubin et al. | 434/118 |

*Primary Examiner*—Raymond J. Bayerl
*Assistant Examiner*—Ba Huynh
*Attorney, Agent, or Firm*—Gregory A. Welte

[57] ABSTRACT

A predictive, adaptive interface for a computer, wherein a user's interaction with the computer is monitored, and future interactions are predicted, based on previous interactions. The invention adapts the interface to the user's preferences, using the predictions. For example, if a particular user repeatedly selects one option from a given menu, the invention detects this repeated selection, and adapts to the user's selection by eliminating other options from the menu.

5 Claims, 9 Drawing Sheets

PREDICTIVE, ADAPTIVE COMPUTER INTERFACE

The invention concerns interfaces for computers, which change for individual users, based on past transactions and predicted future responses of the user.

RELATED APPLICATIONS

Ser. No. 08/217,062, entitled "Ordering and Downloading Resources from Computerized Repositories," in which David Siefert is the Inventor, filed on Mar. 24, 1994.

Ser. No. 08/217,063, entitled "Automated Updating of Computer Software," in which David Siefert is the Inventor, filed on Mar. 24, 1994.

Ser. No. 08/217,066, entitled "Future Boolean Searching of Multiple Repositories of Resources," in which David Siefert is the Inventor, filed on Mar. 24, 1994.

Ser. No. 08/217,067, entitled "Security Aspects of Computer Resource Repositories," in which David Siefert is the Inventor, filed on Mar. 24, 1994.

Ser. No. 08/217,422, entitled "Launching Computer Program Upon Download of Data Created by Program," in which David Siefert is the Inventor, filed on Mar. 24, 1994.

Ser. No. 08/217,476, entitled "Computer System for Management of Resources," in which David Siefert is the Inventor, filed on Mar. 24, 1994.

Ser. No. 08/218,024, entitled "Multiple Repositories of Computer Resources, Transparent to User," in which David Siefert is the Inventor, filed on Mar. 24, 1994.

These applications are hereby incorporated by reference.

BACKGROUND OF THE INVENTION

A simple example will illustrate some situations which the invention improves. Computer programs called CAD (Computer Aided Design) programs allow a user to generate drawings. In a CAD program, a common scenario is the following:

The CAD program presents the user with a display as shown in FIG. 1. The user, by way of a pointing device, selects an option, such as the DRAW option. The CAD program responds by providing a menu 3 of drawing options in FIG. 2. The user selects the CIRCLE option, as indicated by the dashed box surrounding the CIRCLE option. The CAD program, in response, presents a menu 6 of possible ways to draw the circle.

One possible way to draw the circle is to specify a CENTER & RADIUS, as indicated. Another is to specify two points, which are interpreted as the diameter of the circle, as indicated by the TWO POINTS (DIAMETER) option. A third way is to select the THREE POINTS option, which specify a circle by defining three points along the circumference.

However, despite the fact that three options for drawing the circle are possible, many users frequently use only one of the drawing options, such as CENTER AND RADIUS, and rarely, if ever, use the others. Therefore, for such users, menu 6 presents an obstacle with which the user must negotiate, solely for the purpose of eliminating unwanted options.

This elimination step can represent a significant amount of time. In this particular example, during the overall selection process, three selection steps were involved:

1. Selecting the DRAW menu in FIG. 1;
2. Selecting the CIRCLE option in FIG. 2; and
3. Selecting the CENTER AND RADIUS option in FIG. 2.

Selection of the last option (CENTER AND RADIUS) represented (approximately) ⅓ of the total selection steps. This ⅓ represents a significant amount of time wasted. By analogy, a skilled typist would not accept a typewriter which reduced typing speed by a factor of one-third.

OBJECTS OF THE INVENTION

An object of the invention is to provide an improved computer interface.

A further object of the invention is to provide a computer interface which anticipates input from a user.

SUMMARY OF THE INVENTION

In one embodiment, the invention studies the behavior of a user in selecting options in a computer program, and determines which options the user prefers. Later, when presenting options to the user, the invention emphasizes, or suggests, preferred options, and de-emphasizes, or eliminates, others.

In another embodiment, the invention maintains data which indicates which options, for each application program, are preferred by computer users in general. To assist a novice user in learning a given application program, the invention presents restricted sets of options, containing the preferred options, to the novice. After the novice gains experience with the options, the invention presents a greater number of options to the more experienced novice.

DETAILED DESCRIPTION OF THE INVENTION

Overview

Continuing the CAD example from the Background, one form of the invention monitors options selected by a user, and records the options selected. For example, whenever a user selects an option from menu 6 in FIG. 2, the invention, in addition to executing the option, as usual, also records the option selected. After the user makes selections from menu 6 a suitable number of times, such as ten times, the invention examines the usage of this menu, by examining the records, and determines which options the user selected most often.

Figure 3:
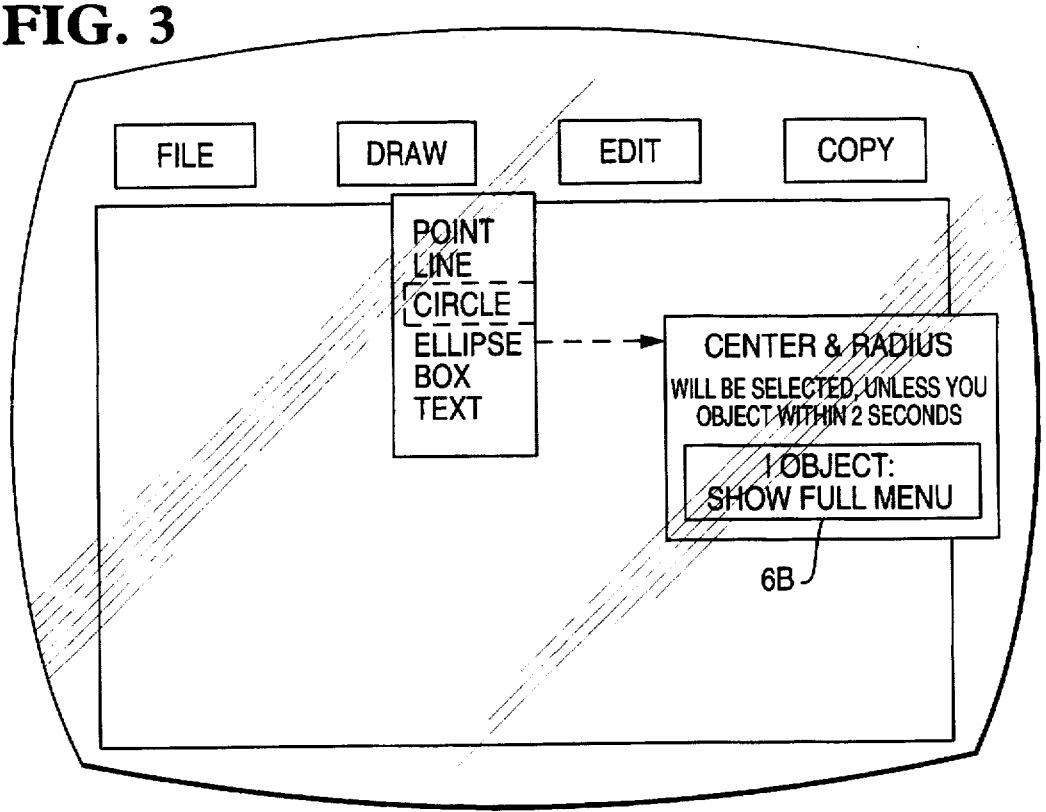
FIGS. 3 and 4 illustrate proposed options which the invention provides.

If the records indicate that the user selected a single option exclusively (such as CENTER & RADIUS), then the invention modifies menu 6, into menu 6A shown in FIG. 3. The modified menu 6A proposes only the most-often selected option (CENTER a RADIUS), and prompts the user to confirm the option, by presenting the ACCEPT PROPOSAL option.

Figure 2:
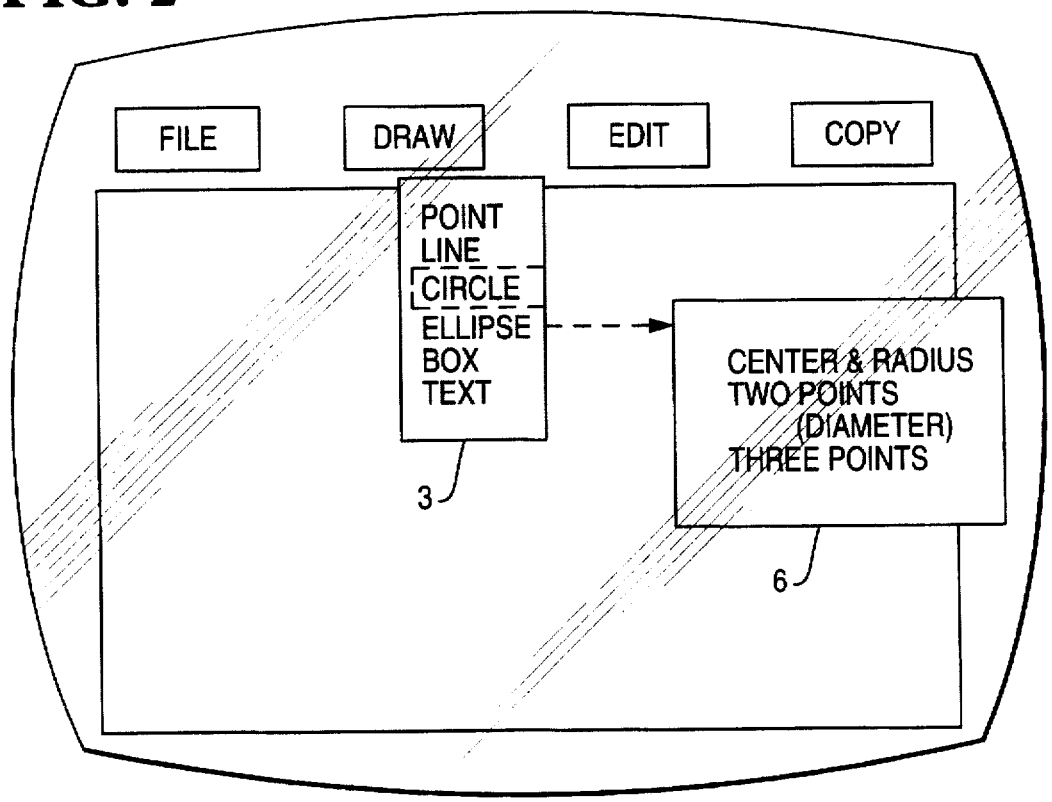

If the user does not wish to accept the proposal, the user can select the FULL MENU option, which causes the full menu 6, of FIG. 2, to be presented, as usual.

The CAD program responds to the acceptance by moving into normal drawing mode, wherein the user can draw a circle in the manner selected from menu 6 or 6A, as the case may be.

For example, the user can move a cursor to a point on the display screen, by using a mouse, and then click the mouse, thereby selecting the center of the circle. Then, the user moves the cursor to another point and clicks again, thereby specifying the radius (which runs between the two points selected). The CAD then program draws the proper circle.

Figure 4:
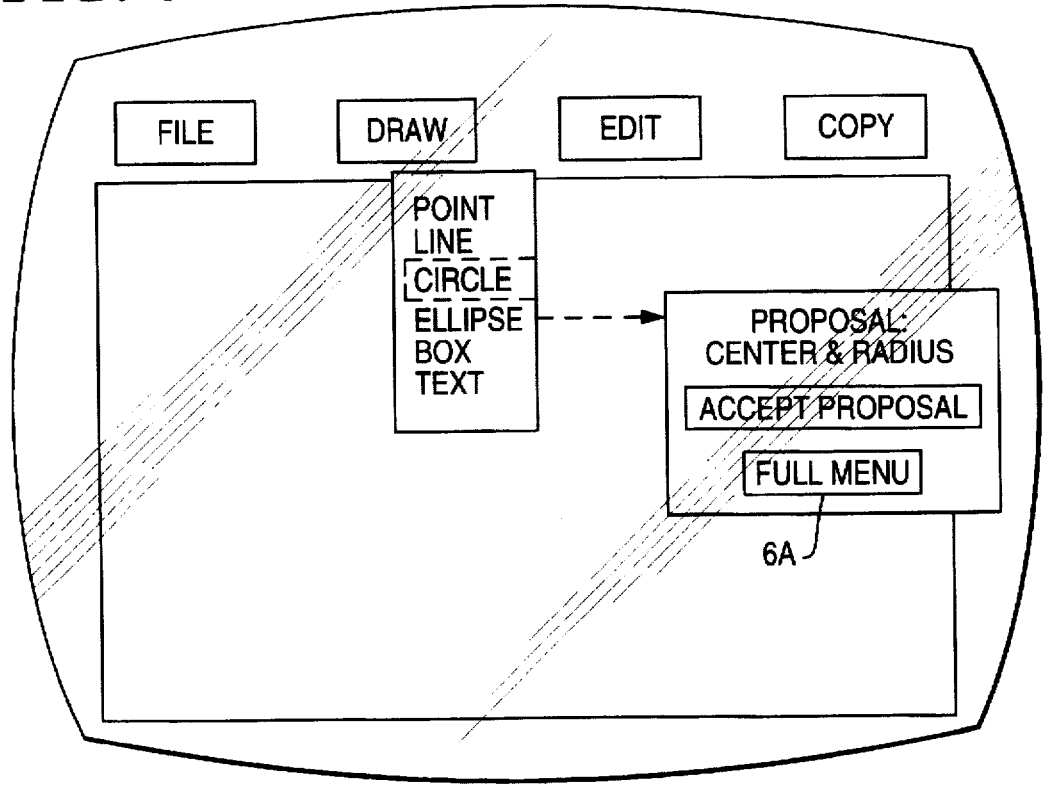

As an alternate approach, as shown in FIG. 4, the invention proposes the CENTER & RADIUS option, and informs the user that this option will be used, unless the user registers objection to the proposal, as by clicking on the OBJECT box. Again, the user can obtain the full menu by selecting the FULL MENU option.

Therefore, in one form of the invention, the options selected by a user are monitored, and menus which present these options are modified, based on a historical record of options chosen. Frequently chosen options are presented in the modified menus, and non-chosen options are eliminated.

Greater Detail

In the general case, it is expected that a user will not always select one, single, option from each menu, such as the CENTER & RADIUS option discussed above. Consequently, the invention, in monitoring the user's behavior, will find that the user selects several options from each menu. However, in the general case, two important events are expected.

One is that all options are not expected to be selected from every menu. Some options will remain unused. The second, which is a type of corollary to the first, is that, of the options selected, not all will be selected with the same frequency. Of the options selected, some options will be preferred.

The invention detects the preferred options, and proposes them, by emphasizing them in menus, over other options. An example will illustrate.

EXAMPLE

Assume that the user always selects one of two options: the LINE option, and the CIRCLE option, from menu 3 in FIG. 2, and nothing else. After monitoring the user, and determining that these two options are the only ones selected, the invention emphasizes those options in future menus.

Figure 5:
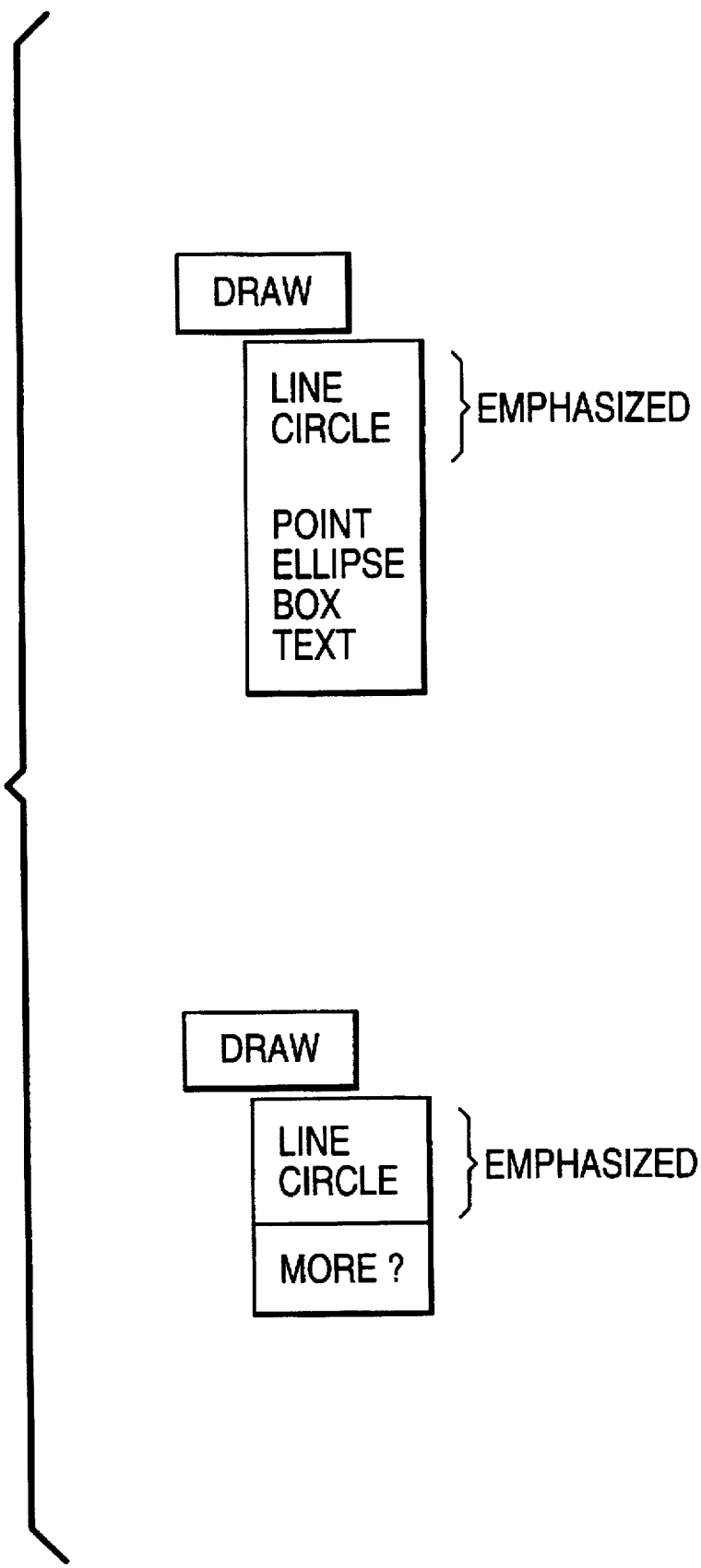
FIG. 5 illustrates two types of emphasis of options.

FIG. 5 illustrates two types of emphasis. On the left, the most popular options (CIRCLE and LINE) are placed at the top of the menu, or otherwise emphasized, as by presentation in different colors from the rest, or presentation in larger typeface, and so on. On the right side of the Figure, emphasis is done by presenting the most popular options exclusively, together with the option of obtaining a full menu, via the option MORE.

Therefore, the invention monitors the options selected by a user of a computer, and, after determining which options are selected most often, emphasizes those options in future menus. The invention predicts which options will be selected, and thereby adapts to the user's preferences. (Of course, the prediction is a probabilistic operation, and will not necessarily be accurate all the time.)

General Case

Figure 1:
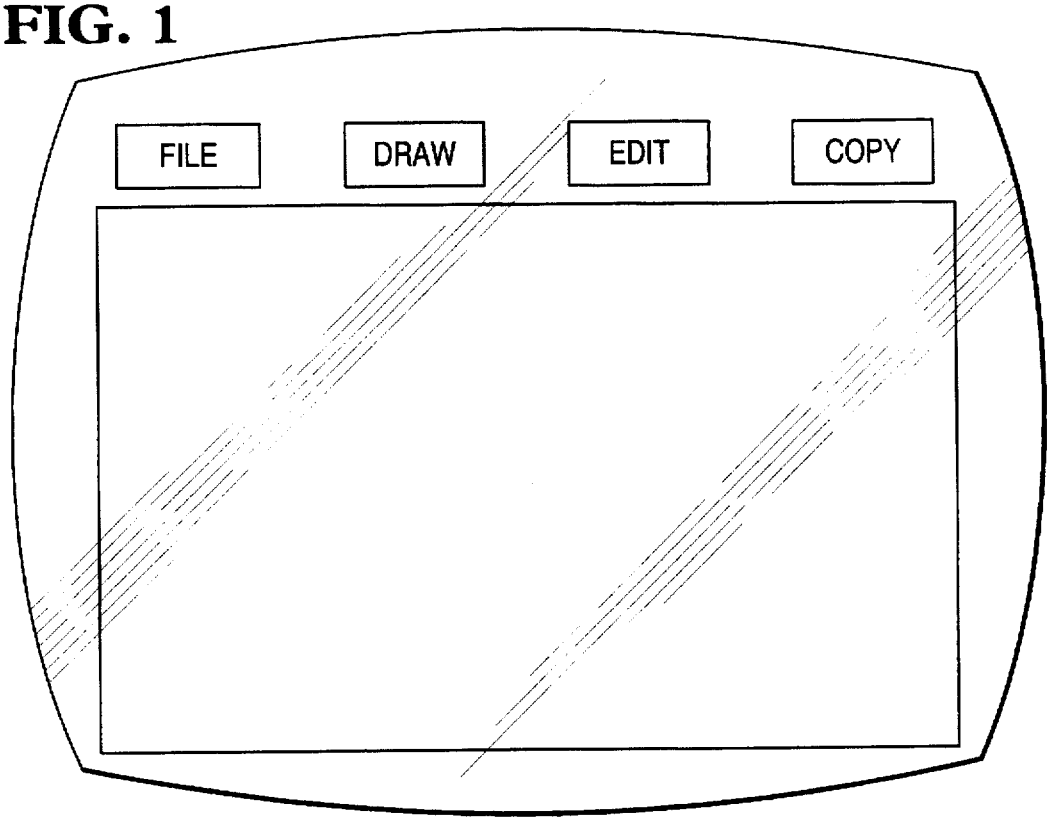
FIGS. 1 and 2 illustrate a prior-art interface, presented by a computer program.

In general, an interactive computer program can be viewed as presenting a hierarchy of menus. For example, in FIG. 6, the program first presents a single menu 9 in MENU LEVEL 1. A user can select from two options. (These options are analogous to the options shown in FIG. 1. Only two options are illustrated in each menu level in FIG. 6, for simplicity, as compared with the four options shown in one menu of FIG. 1.)

Figure 6:
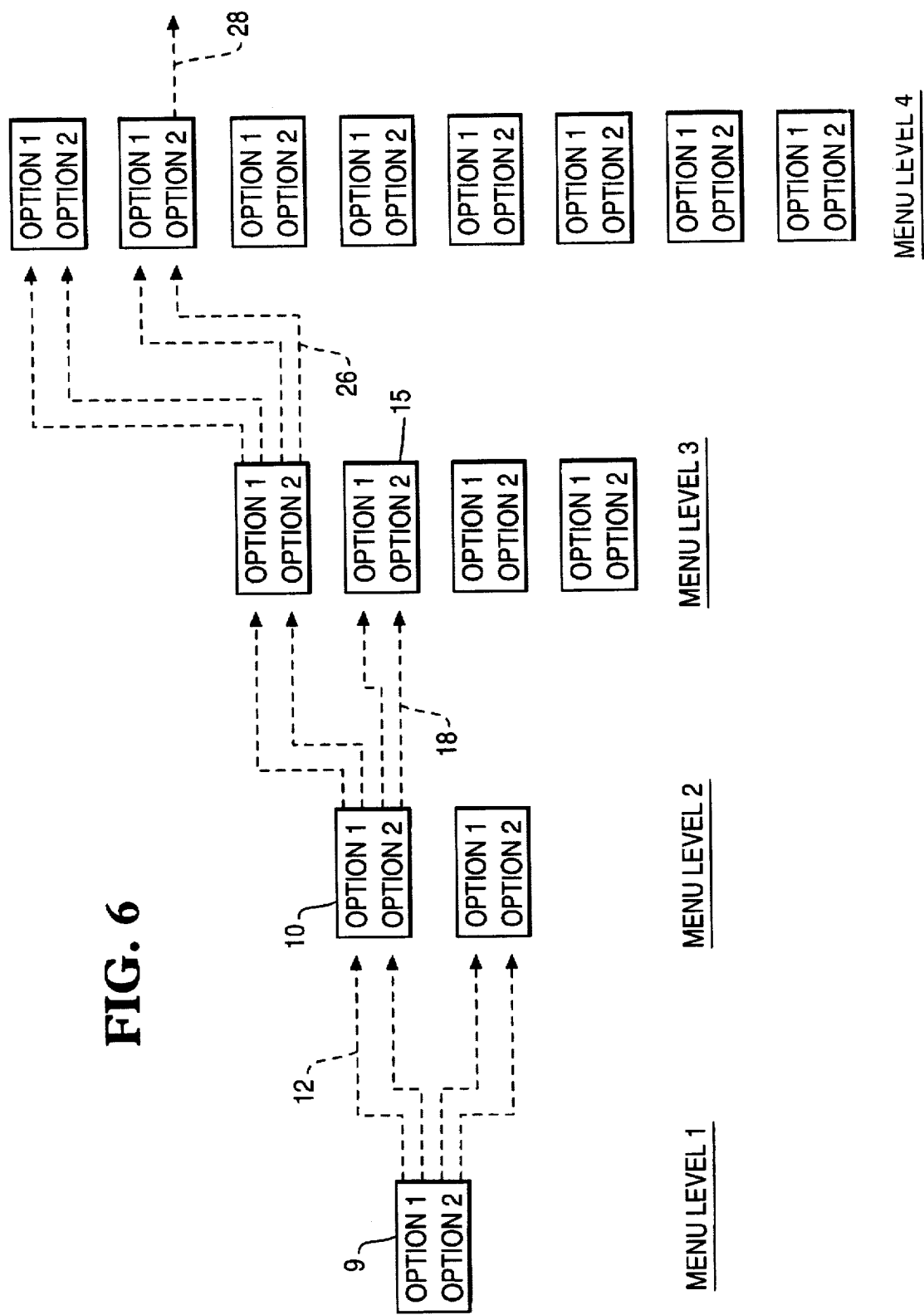
FIG. 6 illustrates a decision tree.

Selection of OPTION 1 in FIG. 6 leads to menu 10 in MENU LEVEL 2, as indicated by arrow 12. Then, selection of OPTION 2 leads to menu 15 in MENU LEVEL 3, as indicated by arrow 18, and so on.

The Invention monitors the behavior of the user, and records the selections made. One recordation method is the following.

Each option in a menu is assigned a number, as shown in FIG. 6. For example, OPTION 1 in MENU 9 in MENU LEVEL 1 is assigned "1" OPTION 1 in MENU 10 in MENU LEVEL 2 is also assigned "1". When the user selects an option, the selection event is recorded as a sequence of these numbers.

The decision path indicated by paths 12, 18, 26, and 28 in FIG. 6 can be recorded as the sequence 1122. The first "1" indicates that, in MENU LEVEL 1, OPTION 1 was selected. The second "1" indicates that, in MENU LEVEL 2, OPTION 1 was selected, and so on.

(It should be noted that, even though MENU LEVEL 2 contains multiple options labeled "1", the second "1" within the sequence 1122 uniquely specifies the OPTION 1 in menu 10. The reason is that the first "1" specifies menu 10.)

After monitoring a user and recording the user's choices for a predetermined time, measured either in hours-and-minutes, or another manner, the invention examines the records (i.e., the collection of sequences such as 1122 mentioned above) and determines which options the user prefers. The preferred options are then emphasized, as discussed above.

Figure 7:
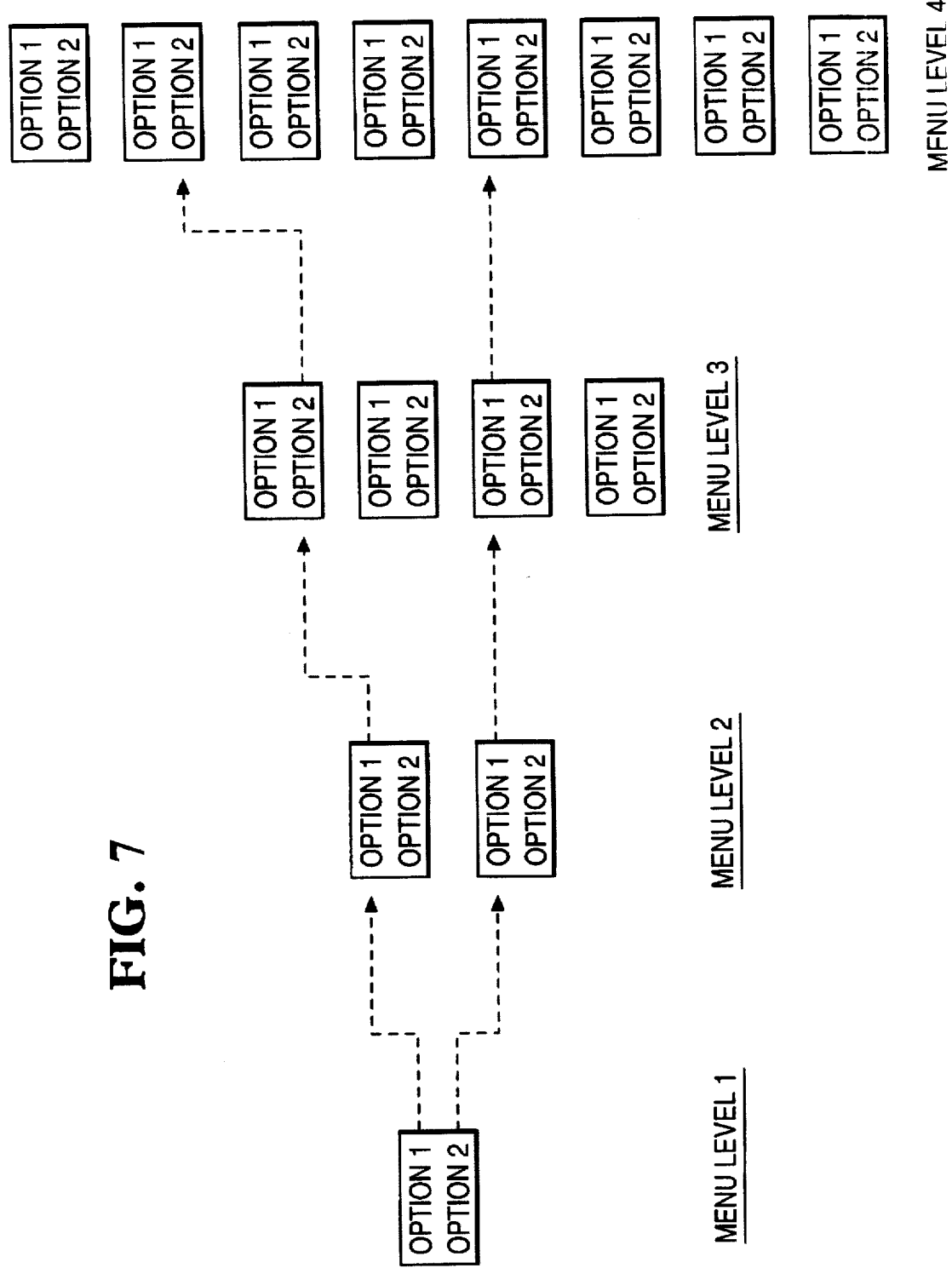
FIG. 7 illustrates two decision paths for the decision tree of FIG. 6.
Figure 8:
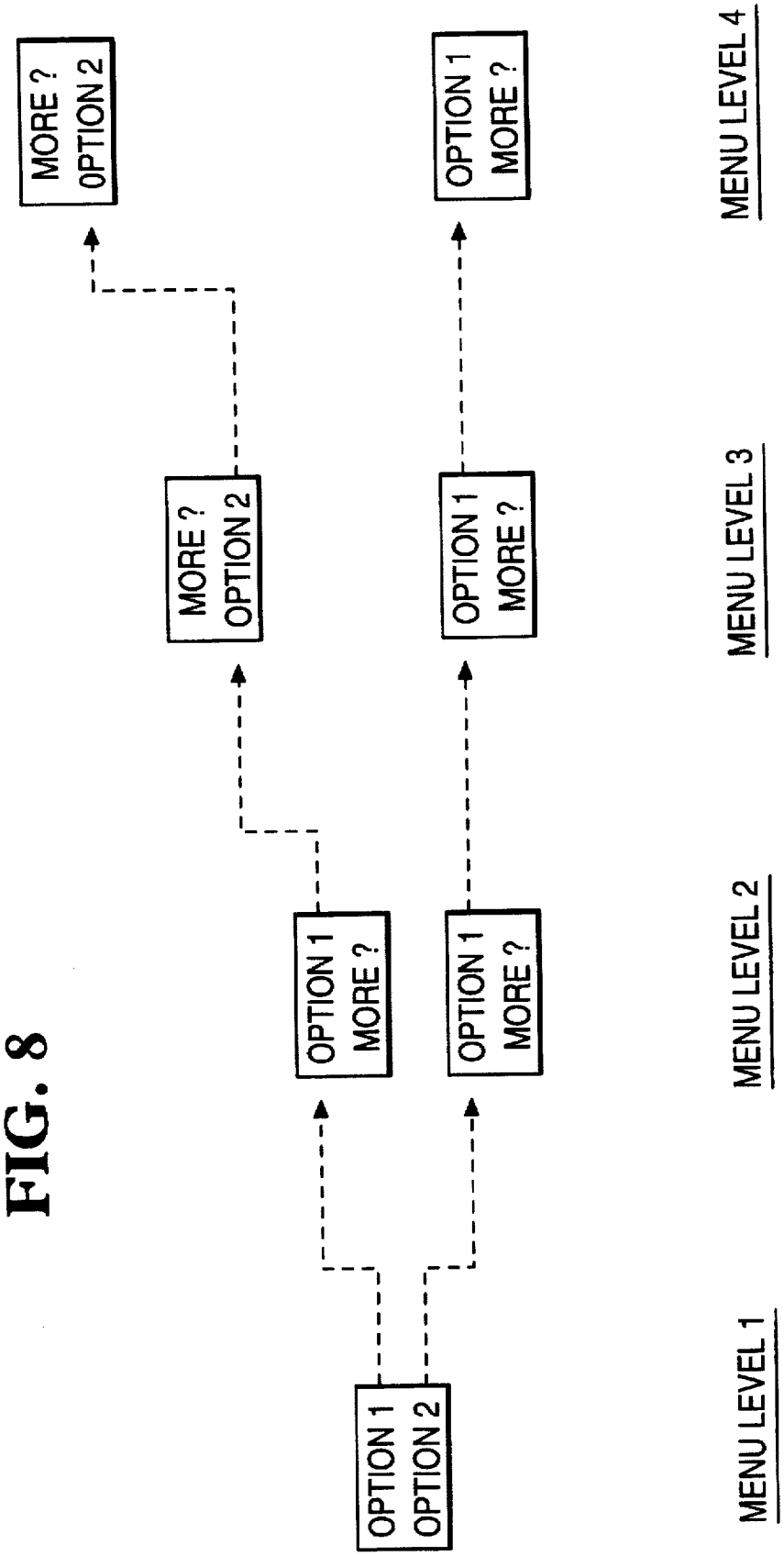
FIG. 8 illustrates a sequence of menus by which the invention can emphasize, or suggest, the two paths of FIG. 7.

As a specific example, assume that a given user exercises the two data paths shown in FIG. 7 exclusively. The invention, after monitoring the user, recognizes these paths as representing preferred options, and modifies the menus as shown in FIG. 8. Each menu contains the OPTION selected, plus an option (MORE ?) to revert to a full menu.

Alternate Embodiment

From one perspective, the invention concerns simplification of an interface of a complex program. The embodiments discussed above initially presented complex menus, and then reduced the content of menus, after monitoring usage by a user.

Another embodiment can be considered to be a converse of the preceding embodiments: in the preceding, complex menus were replaced by simpler menus. As another embodiment, simpler menus evolve into more complex menus. The alternate embodiment can be used in the instruction of new users of a program.

For example, return to the CAD program discussed earlier. A test is first run on a sample of people. The people operate the CAD program, and the average frequency of usage of each option is obtained. The frequencies indicates the most-used options, the next-most used, and so on.

(Alternately, the designer of the program can make an educated guess as to the most-used options.)

Irrespective of how the most-used options are ascertained, the invention presents a reduced menu, containing those options, such as that shown in FIG. 3. After the user becomes familiar with these options, new options are added to the menus, making the menus more complex. Eventually, the full menu 6 of FIG. 2 will be attained.

The attainment of familiarity by users can be determined in several ways. One is repetition. If a user successfully exercises a given option a given number of times, such as ten, then it is reasonable to assume mastery of the option.

Another can be done by testing. For example, in the case of a CAD program, the invention first presents a reduced menu, such as that shown in FIG. 4. Then, at a later time, the invention asks the user to draw a circle using the menu. When the user successfully does so, the invention expands the menu, to menu 6 shown in FIG. 2, for example.

Therefore, the general sequence is to

1. Present a user with simplified menus;
2. Ascertain whether the user has mastered the simplified menus;
3. Add options to the menus; and
4. Return to step 2.

Figure 9:
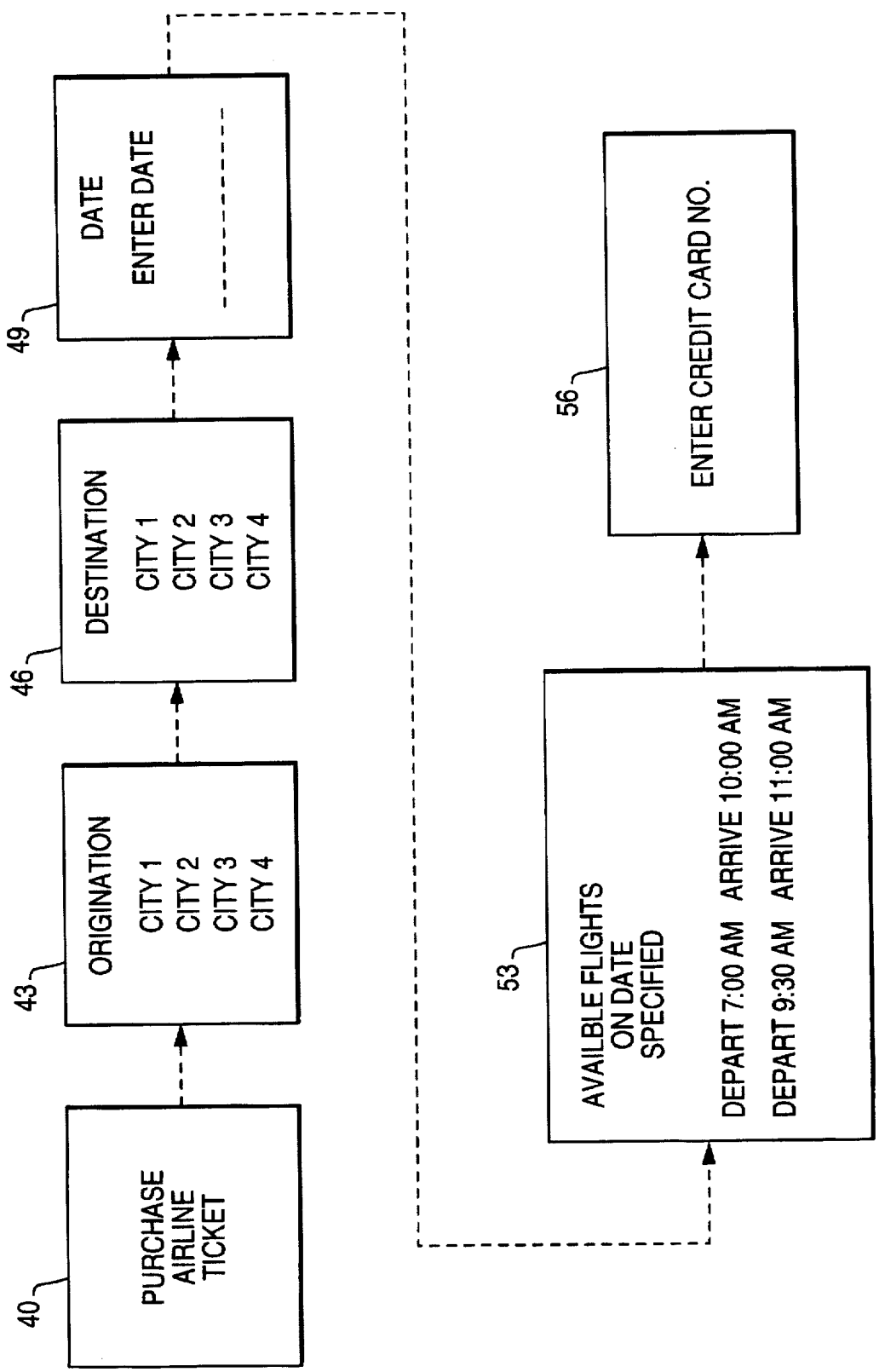
FIG. 9 illustrates a basic sequence of options for purchasing airline tickets.

A specific example can take the form of an automated vending system for purchase of airline tickets. FIG. 9 shows the menus presented to the purchaser. The user first selects the single option in menu 40. Then the user selects a city from which the flight is to originate, in menu 43. Next, the user selects a destination from menu 46.

After this, the user selects a date on which to fly, by entering a date in response to menu 49. Next, menu 53 presents a list of the possible flights which match the user's needs. The user selects one. Finally, menu 56 requests a credit card number, by which payment is to be made.

Figure 10:
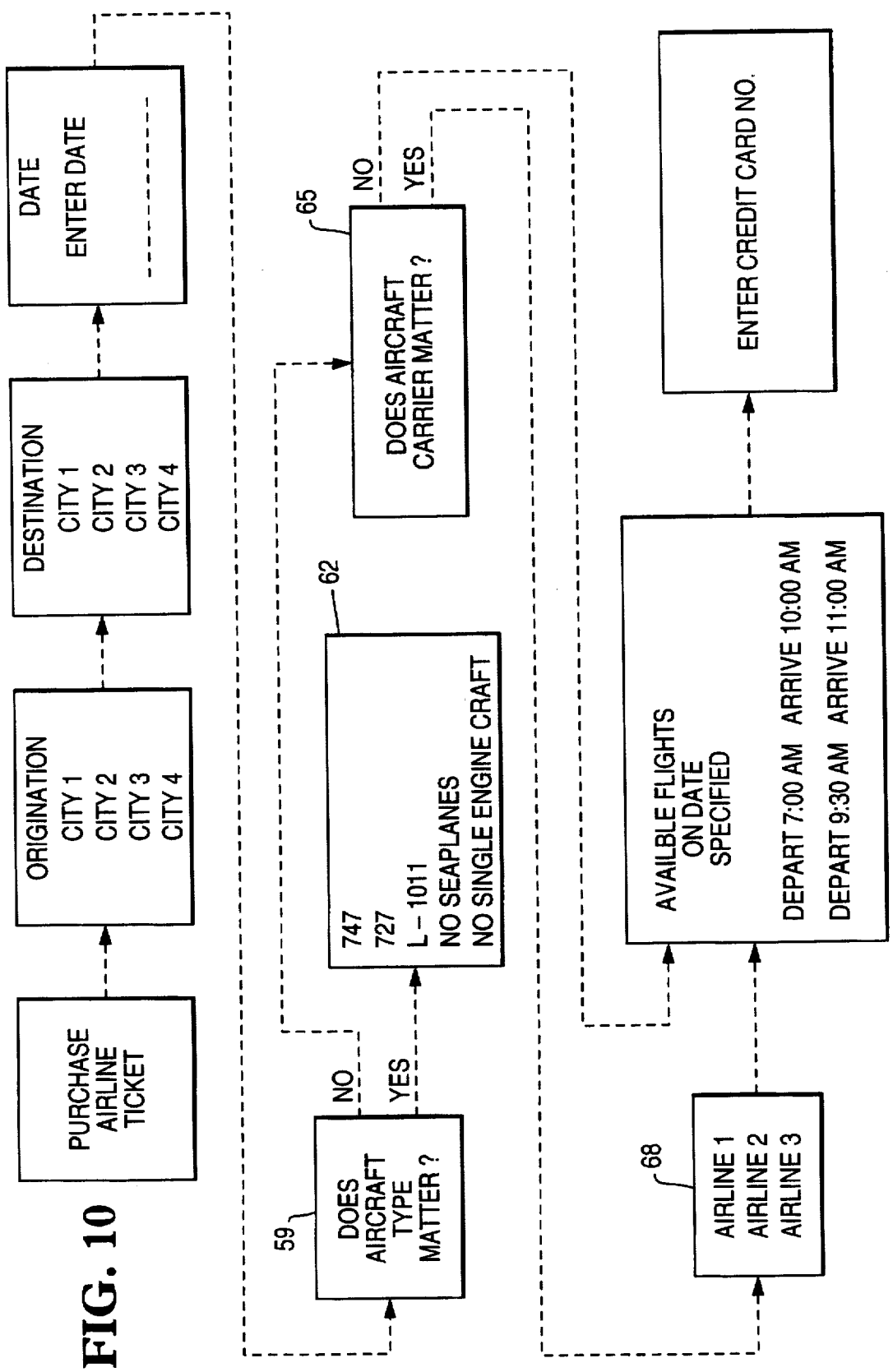
FIG. 10 illustrates a more advanced sequence of options for purchasing airline tickets.

An experienced customer may wish to see a more comprehensive set of options. FIG. 10 shows options 59, 62, 65, and 68 added to those of FIG. 9. These options allow the customer to select, or reject, particular types of aircraft and particular airline companies. These options were not presented in FIG. 9, on the assumption that a first-time user would not wish to become involved at the level of detail shown in FIG. 10.

Additional Considerations

1. The invention presents different interfaces to different users (or to the same user, but at different times), in order to allow the users to interact with a given computer program. This operation should not be confused with systems which present different interfaces, in order to interact with different programs.

An example of the latter type of system is found in computer systems generally. Different programs, in general, present different interfaces. However, the programs do not modify their interfaces for different users, nor modify their interfaces as a given user becomes more proficient.

2. The discussion above was framed in terms of a CAD program. However, it should be recognized that the invention is applicable to any interactive program in which a user negotiates with a decision tree.

3. The level of experience of a user, which determines which options to present to the user, is stored in a file called a PROFILE, which is discussed later in greater detail. As stated above, the level of experience can be determined by testing the user, or simply by the amount of total time which the user has logged using a given application program.

4. After a novice user becomes sufficiently experienced, the user may wish to terminate the "learning mode" of the invention, and enter the "restricted menu" mode discussed in connection with FIGS. 2-5, and others. The invention can simply ask the user, by a computer prompt, whether a change in modes is desired.

Alternately, a benchmark can be established, wherein a change in modes is made, when the user reaches a specified level of experience, such as a given number of hours of operating a given program.

5. The time at which the invention computes which options to present to the user is not necessarily significant. The computation can be done prior to a user's interaction with an application program. Such a computation, in effect, generates a series of menus. The computation can also be done in real time, as the user operates the program.

6. The user can provide input to the interface in any appropriate manner, such as through a keyboard, a touch-sensitive screen, a pointing device, and a voice recognition system.

The interface can be located remotely from the computer which it represents. For example, the interface can be presented through a common television, communicating through a cable television network.

7. A user's PROFILE contains information which describes relevant characteristics of the user, including the user's level of proficiency in various computer programs. The PROFILE also contains information as to which application programs the user operates most frequently. PROFILE is a term-of-art, and is explained in the "Related Applications."

In a multi-user, global-access network, the user's PROFILE is stored at a location which is accessible to the network, and made available, by known techniques, to systems on the network when needed. Based on the PROFILE, the interface is modified, in the manner discussed above.

Alternate Characterization of Invention

Figure 11:
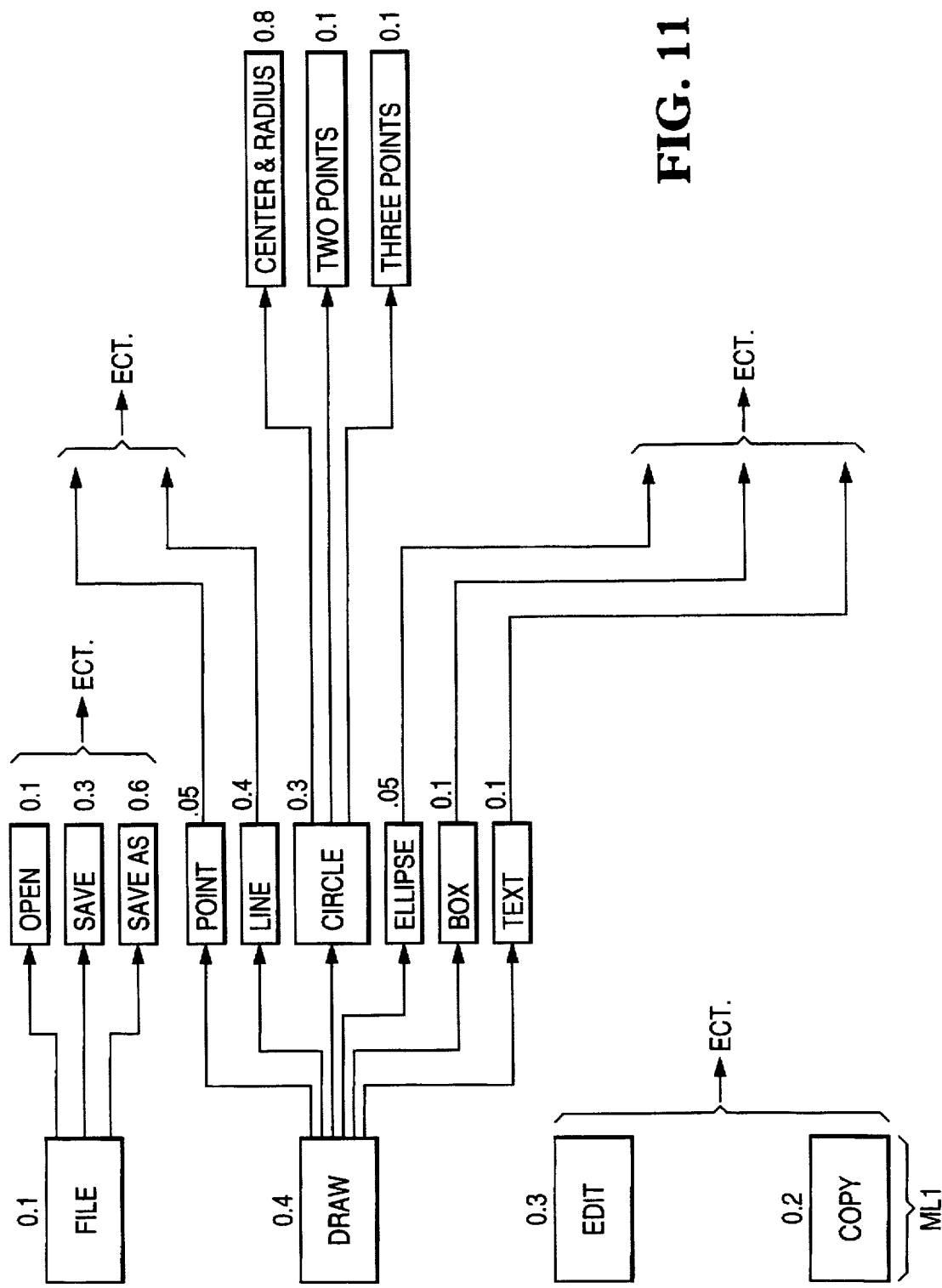
FIG. 11 illustrates a historical record of probabilities for options in a decision tree.

FIG. 11 illustrates a decision tree, based on the menus shown in FIG. 2. The numbers beside each decision point, such as the "0.03" beside the decision point CIRCLE refer to the probability of choosing that decision point, compared with the other decision points in that level.

Restated, the "0.4" adjacent the DRAW decision point indicates that, of the four options FILE, DRAW, EDIT, and COPY, the DRAW option is selected with probability of 0.4. Similarly, the "0.3" adjacent the decision point CIRCLE indicates that, of the six options, ranging from POINT to TEXT, the CIRCLE option is selected with probability 0.3.

The data of FIG. 11 allows conditional probabilities to be computed. That is, when the user is at MENU LEVEL 1, the probability of selecting the POINT option in MENU LEVEL 2 is (0.05)(0.4), or 0.02. However, once the user reaches menu level 2, the probability of selecting the same POINT option rises, to 0.05.

The probabilities of FIG. 11 can be found in several ways. One is to monitor the behavior of individual users, and find each user's individual probabilities. Another is to monitor multiple users, and use an average. A third is to simply estimate the probabilities, based on experience.

Irrespective of how the probabilities were ascertained, they allow at least two implementations of the invention.

One is to compute the highest probabilities of all available decision paths, and to propose those paths as options. For example, when a user is at LEVEL 1, the path having the highest probability is DRAW - LINE - (and those following). The next highest is DRAW - CIRCLE - CENTER & RADIUS.

A predetermined number of the paths having the highest probabilities is proposed to the user. For example, the predetermined number may be two, in which case the two paths just identified would be proposed, as by the emphasis discussed above.

When the user moves to another level, or deviates from the proposed paths, however, the paths having the highest probabilities can change.

Another implementation is to use the probabilities to generate simplified menus, for instructional purposes. In the example above, the two paths suggested above would be proposed to a new user, together with the option of seeing all possible paths. As the user became more proficient, less probable paths would be made available.

Therefore, in one form of the invention, the decision paths taken by a population which uses a given computer program are recorded, in the forms of the probabilities shown in FIG. 11. A set of the most common paths is proposed to all users, both novice and experienced.

This set is proposed to the novices, because the set represents the most-used paths, and, for that reason, are considered the most valuable to learn. This set is proposed to the experienced users, because it is believed that the paths represent the most likely choices of the experienced users.

As both types of user negotiate the decision tree, the most probable paths are continually suggested, until sufficient data is obtained by the program to perform execution, which, in the examples above, took the form of drawing a circle, or issuing airline tickets.

Numerous substitutions and modifications can be undertaken without departing from the true spirit and scope of the invention. What is desired to be secured by Letters Patent is the invention as defined in the following claims.

We claim:

1. In a computer, the improvement comprising the following steps:
    a) presenting a first interface to a user, which contains options which the user may select;
    b) ascertaining when the user attains a predetermined amount of experience with the interface, and then presenting a second interface to the user, which contains additional options;
    c) identifying the most-selected option in the first interface;
    d) proposing the most-selected option to the user; and
    e) providing means for the user to accept the proposed option for automatic execution.

2. In a computer, the improvement comprising:
    a) means for generating an interface, which presents options to the user;
    b) means for identifying the most-selected option;
    c) means for
        i) proposing the most-selected option to the user, and
        ii) allowing the user to accept the most-selected option for automatic execution.

3. In a computer system, which services a plurality of users, in which each user navigates through a decision tree, which comprises decision nodes at which one or more options are chosen, the improvement comprising the following steps:
    a) for respective nodes, maintaining data which indicates preferred options, expected to be chosen at those nodes;
    b) when the user reaches a node,
        i) proposing the most-preferred option for that node to the user for automatic execution, and
        ii) displaying an option to the user which allows the user to see a menu containing all options available for that node.

4. System according to claim 3, in which said data is derived by monitoring previous selections of options by one or more users.

5. Method according to claim 1, wherein the emphasized options appear in the first interface.

* * * * *